United States Patent
Mangold et al.

(10) Patent No.: US 7,302,589 B2
(45) Date of Patent: Nov. 27, 2007

(54) METHOD FOR SECURING MEMORY MAPPED CONTROL REGISTERS

(75) Inventors: Richard P. Mangold, Forest Grove, OR (US); Keith Shippy, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 1425 days.

(21) Appl. No.: 10/079,004

(22) Filed: Feb. 20, 2002

(65) Prior Publication Data

US 2003/0159057 A1   Aug. 21, 2003

(51) Int. Cl.
*G06F 11/30* (2006.01)
*G06F 12/14* (2006.01)
*G06F 7/04* (2006.01)
*G06F 17/30* (2006.01)
*H04L 9/32* (2006.01)
*H04L 9/00* (2006.01)
*G06K 9/00* (2006.01)
*H04K 1/00* (2006.01)

(52) U.S. Cl. ............ 713/193; 713/194; 713/176; 713/177; 713/178; 726/27; 726/28; 726/29; 726/30; 726/3; 726/4; 380/200; 380/201; 380/202; 380/203

(58) Field of Classification Search ............ None
See application file for complete search history.

(56) References Cited

U.S. PATENT DOCUMENTS

| | | | |
|---|---|---|---|
| 6,920,221 B1* | 7/2005 | Faber et al. | 380/200 |
| 6,957,329 B1* | 10/2005 | Aleksic et al. | 713/150 |
| 6,978,018 B2* | 12/2005 | Zimmer | 380/30 |
| 2002/0144153 A1* | 10/2002 | LeVine et al. | 713/201 |
| 2003/0065863 A1* | 4/2003 | Wyland | 710/305 |

* cited by examiner

*Primary Examiner*—Ayaz Sheikh
*Assistant Examiner*—Longbit Chai
(74) *Attorney, Agent, or Firm*—Blakely, Sokoloff, Taylor & Zafman LLP

(57) ABSTRACT

According to one embodiment, a method is disclosed. The method includes storing a first list of hardware registers, receiving video data at an application program, receiving a second list of hardware registers from a device driver, determining whether the first list of hardware registers matches the second list of hardware registers, and if so, streaming the video data to a video decoder.

21 Claims, 5 Drawing Sheets

METHOD FOR SECURING MEMORY MAPPED CONTROL REGISTERS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention relates to computer systems; more particularly, the present invention relates to the protection of data received at a computer system.

BACKGROUND

Widespread use of the Internet and electronic mail (e-mail) has left millions of personal computers (PCs) vulnerable to downloaded viruses and other types of malicious software that can destroy programs, copy and upload private documents, and perform other harmful acts, frequently without the PC operator's knowledge. The increasing popularity of downloaded programs has multiplied the problem significantly, since such programs create more opportunities to unknowingly download the malicious software.

Due to their open architecture, most PCs provide very little protection against such destructive software. It is this very openness that has made the PC platform the general-purpose solution provider that it is. Other types of computers are also vulnerable to such attacks in varying degrees, but the pervasive use of PCs has drawn much attention to the problem as it applies to PCs.

In the past, owners of copyrighted information or other intellectual property have been reluctant to allow their property to be viewed on the PC platform (books, movies, sensitive corporate documents, etc.) as the nature of the open PC platform makes the property vulnerable to mischievous software that may run in the background. Although self-replicating destructive software (viruses) attracts the most attention, copyright owners are more concerned with the illegal copying and distribution of any document that they permit to be downloaded to a computer. This is particularly true of video that is available electronically by downloading over a network such as the Internet, or service provider networks. The ease of copying downloaded video makes it easy to illicitly reproduce and forward copyrighted materials without detection of this activity by the copyright owner.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
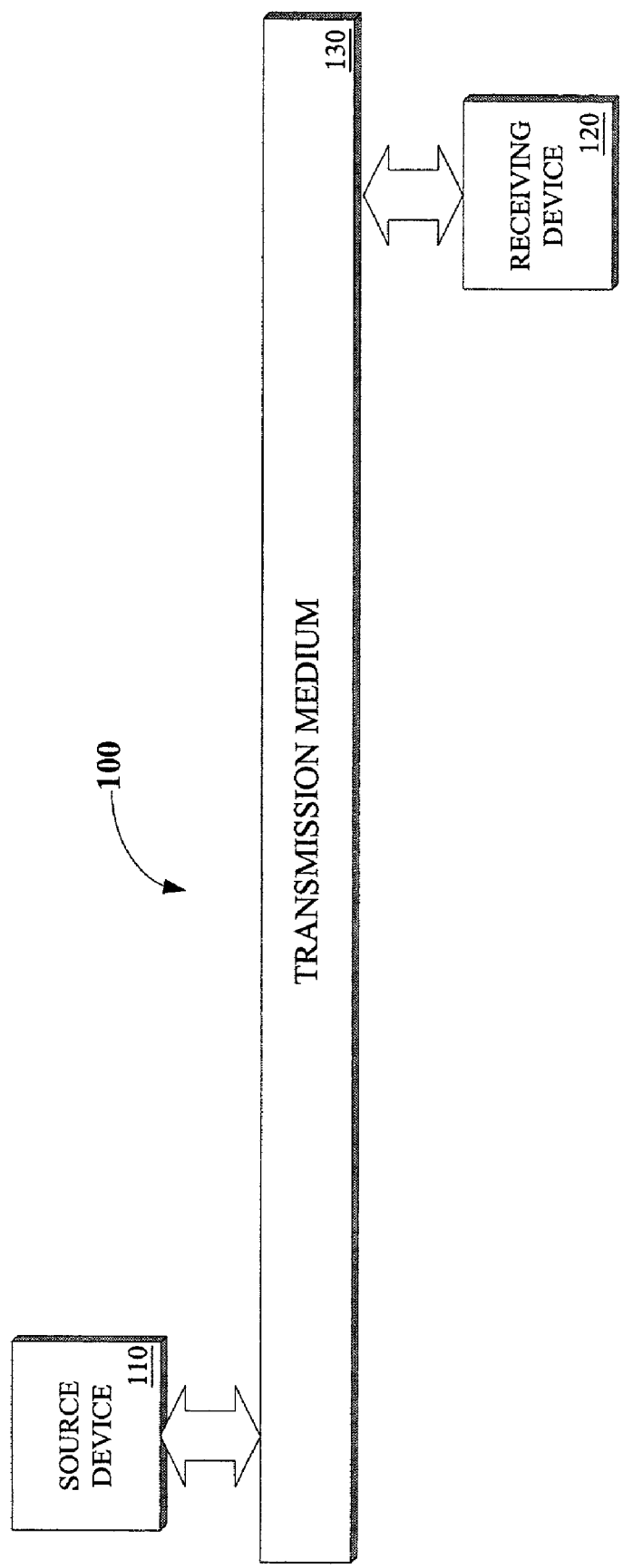
FIG. 1 illustrates one embodiment of a network.

A method for protecting memory mapped control registers from unauthorized access by user level applications is described. According to one embodiment, a device driver is initialized upon powering up a computer system or set-top appliance. During initialization, the driver locates a video decoder and allocates any detected physical hardware registers. Subsequently, the driver passes the list of hardware registers to a kernel security module.

The kernel security module verifies the digital signature of the driver. The kernel security module then securely stores the list for later use. Afterward, an application program begins to receive video content from a content source. The application calls an application level interface to stream content to the video decoder. It is then determined whether the application call is the first call for video streaming.

If it is determined that it is the first call, the interface requests the list of hardware registers from the device driver. The driver then maps the resources into a virtual space accessible from the application and returns the resources. The application level interface forwards the virtual memory address to an application level security module to validate the hardware registers to which the application intends to stream the content.

Subsequently, the application security module verifies the signature of the interface and calls the kernel security module via a secure interface in order to verify the application's virtual resources map. As a result, the application's virtual resources map is compared to the stored list of physical resources. If the resources match, the video content is streamed through those resources directly to the video decoder for processing. Otherwise, the video content will be precluded from steaming to the video decoder.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs), execution cores, etc.).

FIG. 1 illustrates one embodiment of a network 100. Network 100 includes a computer system 110 and a computer system 120 coupled via a transmission medium 130. In one embodiment, computer system 110 operates as a source device that sends an object to computer system 120, operating as a receiving device. The object may be, for example, a video file, a data file, an executable, or other digital objects. The object is sent via data transmission medium 130.

The data transmission medium 130 may be one of many mediums such as a satellite transmission, an internal network connection, an Internet connection, or other connections. The transmission medium 130 may be connected to a plurality of untrusted routers (not shown) and switches (not shown).

According to one embodiment, computer system 110 is a server computer, while computer system 120 is a client set-top appliance. In a further embodiment, the set-top appliance is implemented for cable television or digital satellite services that receive audio and video content from computer system 110. However, in other embodiments, computer system 120 may be a personal computer (PC) coupled to computer system 110, wherein the transmission medium is the Internet.

Figure 2:
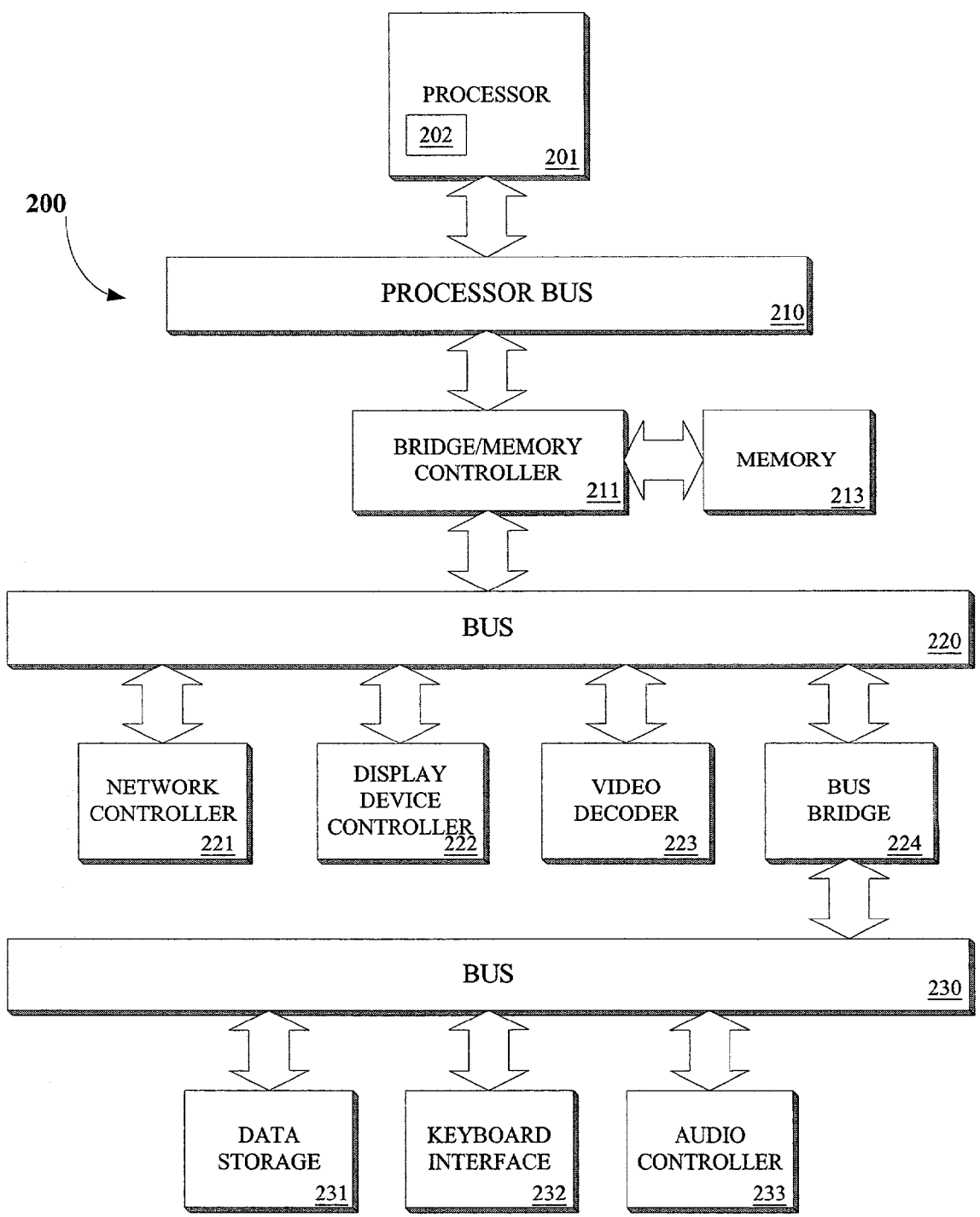
FIG. 2 is a block diagram of one embodiment of a computer system.

FIG. 2 is a block diagram of one embodiment of a computer system 200. Computer system 200 may be implemented as computer system 120 (both shown in FIG. 1). The computer system 200 includes a processor 201 that processes data signals. Processor 201 may be a complex instruction set computer (CISC) microprocessor, a reduced instruction set computing (RISC) microprocessor, a very long instruction word (VLIW) microprocessor, a processor implementing a combination of instruction sets, or other processor device.

In one embodiment, processor 201 is a processor in the Pentium® family of processors including the Pentium® II family and mobile Pentium® and Pentium® II processors available from Intel Corporation of Santa Clara, Calif. Alternatively, other processors may be used. FIG. 2 shows an example of a computer system 200 employing a single processor computer. However, one of ordinary skill in the art will appreciate that computer system 200 may be implemented using multiple processors.

Processor 201 is coupled to a processor bus 210. Processor bus 210 transmits data signals between processor 201 and other components in computer system 200. Computer system 200 also includes a memory 213. In one embodiment, memory 213 is a dynamic random access memory (DRAM) device. However, in other embodiments, memory 213 may be a static random access memory (SRAM) device, or other memory device.

Memory 213 may store instructions and code represented by data signals that may be executed by processor 201. According to one embodiment, a cache memory 202 resides within processor 201 and stores data signals that are also stored in memory 213. Cache 202 speeds up memory accesses by processor 201 by taking advantage of its locality of access. In another embodiment, cache 202 resides external to processor 201.

Computer system 200 further comprises a bridge memory controller 211 coupled to processor bus 210 and memory 213. Bridge/memory controller 211 directs data signals between processor 201, memory 213, and other components in computer system 200 and bridges the data signals between processor bus 210, memory 213, and a first input/output (I/O) bus 220.

In one embodiment, I/O bus 220 may be a single bus or a combination of multiple buses. In a further embodiment, I/O bus 220 may be a Peripheral Component Interconnect adhering to a Specification Revision 2.1 bus developed by the PCI Special Interest Group of Portland, Oreg. In another embodiment, I/O bus 220 may be a Personal Computer Memory Card International Association (PCMCIA) bus developed by the PCMCIA of San Jose, Calif. Alternatively, other busses may be used to implement I/O bus. I/O bus 220 provides communication links between components in computer system 200.

A network controller 221 is coupled I/O bus 220. Network controller 221 links computer system 200 to a network of computers (not shown in FIG. 2) and supports communication among the machines. In one embodiment, computer system 200 receives streaming video data from a computer 110 via network controller 221.

A display device controller 222 is also coupled to I/O bus 220. Display device controller 222 allows coupling of a display device to computer system 200, and acts as an interface between the display device and computer system 200. In one embodiment, display device controller 222 is a monochrome display adapter (MDA) card.

In other embodiments, display device controller 222 may be a color graphics adapter (CGA) card, an enhanced graphics adapter (EGA) card, an extended graphics array (XGA) card or other display device controller. The display device may be a television set, a computer monitor, a flat panel display or other display device. The display device receives data signals from processor 201 through display device controller 222 and displays the information and data signals to the user of computer system 200.

A video decoder 223 is also coupled to I/O bus 220. Video decoder 223 is a hardware device that translates received encoded data into its original format. According to one embodiment, video decoder 223 is a Moving Picture Expert Group 4 (MPEG-4) decoder. However, one of ordinary skill in the art will appreciate that video decoder 223 may be implemented with other types of MPEG decoders.

Computer system 200 also includes a second I/O bus 230 coupled to I/O bus 220 via a bus bridge 224. Bus bridge 224 operates to buffer and bridge data signals between I/O bus 220 and I/O bus 230. I/O bus 230 may be a single bus or a combination of multiple buses. In one embodiment, I/O bus 230 is an Industry Standard Architecture (ISA) Specification Revision 1.0a bus developed by International Business Machines of Armonk, N.Y. However, other bus standards may also be used, for example Extended Industry Standard Architecture (EISA) Specification Revision 3.12 developed by Compaq Computer, et al.

I/O bus 230 provides communication links between components in computer system 200. A data storage device 231 is coupled to I/O bus 230. I/O device 231 may be a hard disk drive, a floppy disk drive, a CD-ROM device, a flash memory device or other mass storage device. A keyboard interface 232 is also coupled to I/O bus 230. Keyboard interface 232 may be a keyboard controller or other keyboard interface. In addition, keyboard interface 232 may be a dedicated device or can reside in another device such as a bus controller or other controller. Keyboard interface 232 allows coupling of a keyboard to computer system 200 and transmits data signals from the keyboard to computer system 200. An audio controller is also coupled to I/O bus 230. Audio controller 233 operates to coordinate the recording and playing of sounds.

According to one embodiment, computer system 200 includes a mechanism that secures received video data from unauthorized access. In many operating systems, software applications are provided access to hardware control registers as mapped into the particular application's memory space. In particular, an application may be granted access to video decoder registers for a video decoder such as video decoder 223. In such an instance, an MPEG source may stream content into the video decoder hardware by accessing the video decoder registers using libraries provided by a hardware vendor.

Typically, there is a window of opportunity for a rogue application to access the video content between the time the video decoder is queued to access the memory registers and the time the content is decoded and executed by the video decoder. During that window, a rogue application may give a false memory address to read or write to (e.g., intercept the call to the video decoder and trick the application software into reading or writing the content to memory registers associated with another software application).

In addition, using virtual memory technology, the memory address may remain the same. However, the page tables may be changed such that the memory addresses are correct, but physically translate to a different address. Therefore, a mechanism and apparatus to protect against an un-authorized application deceiving an MPEG source application into writing the content into registers that are not actually located in video decoder hardware is provided.

Figure 3:
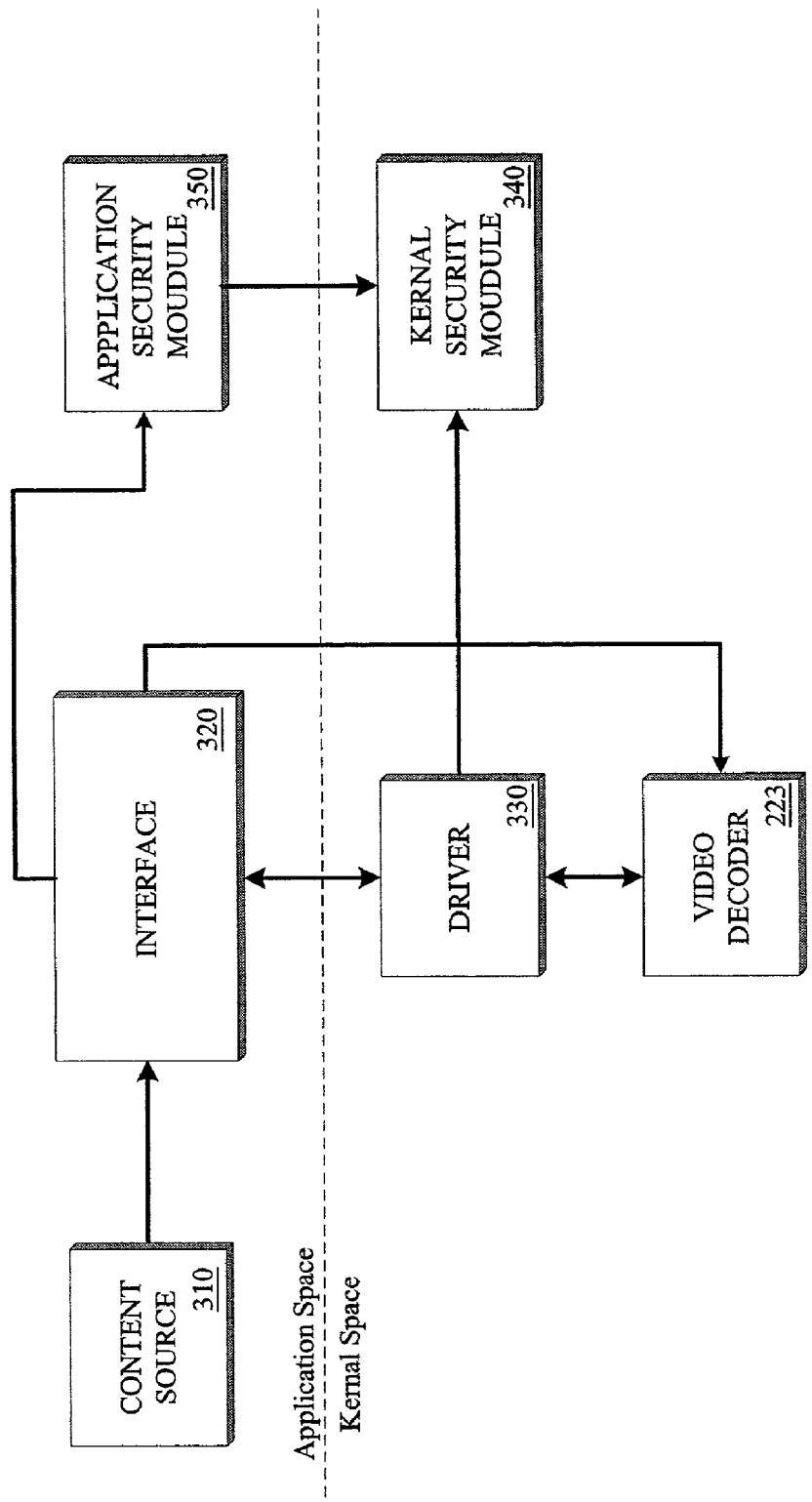
FIG. 3 is a block diagram of one embodiment of a mechanism for protecting memory mapped control registers from unauthorized access.

FIG. 3 is a block diagram of one embodiment of a mechanism to protect memory mapped control registers from unauthorized access. According to one embodiment, the mechanism is implemented at the application space and the kernel space. The application space components include a content source 310, a software interface 320 and an application security module 350. The kernel space components include a video decoder device driver 330, video decoder 223 and a kernel security module 340.

Content source 310 transmits digital video content to interface 320. As discussed above, content source 310 may be a public network (e.g., the Internet), or a private network. In other embodiments, content source 310 may be a DVD or other video source. Software interface 320 serves as an interface to a software player application (not shown) that plays the video content received from content source 310. In particular, interface 320 accesses and decrypts the received video content.

Device driver 330 is a software program that interacts directly with video decoder 223. In particular, driver 330 enumerates and communicates with decoder 223. In one embodiment, driver 330 detects and allocates hardware registers within video decoder 223 for access by applications at computer system 200 boot up. In addition, driver 330 passes a list of any allocated resources to tamper resistant module 340. According to a further embodiment, driver 330 and interface 320 implement digital signatures and public/private key technologies to prevent tampering and to ensure that the driver 330/decoder 223 combination have authorized access to the video content.

Application tamper resistant security module 340 receives the list of allocated resources from driver 330. Upon receiving the resources, security module 340 verifies the integrity of driver 330 via digital signatures. In addition, security module 340 securely stores the list of allocated resources.

Application tamper resistant security module 350 receives a list of allocated application level resources from interface 320 whenever a streaming application (or a library that interfaces to the hardware at the application level) is about to release protected content to registers within video decoder 223. In response, security module 350 will make a call to security module 340 which will translate the virtual (application) level resources to physical resources and compare the resources against a stored list. According to one embodiment, the interface between security module 340 and security module 350 is secured by a random number secret key system to prevent an unauthorized application from deceiving security module 350 into relinquishing the list of resources.

Figure 4A:
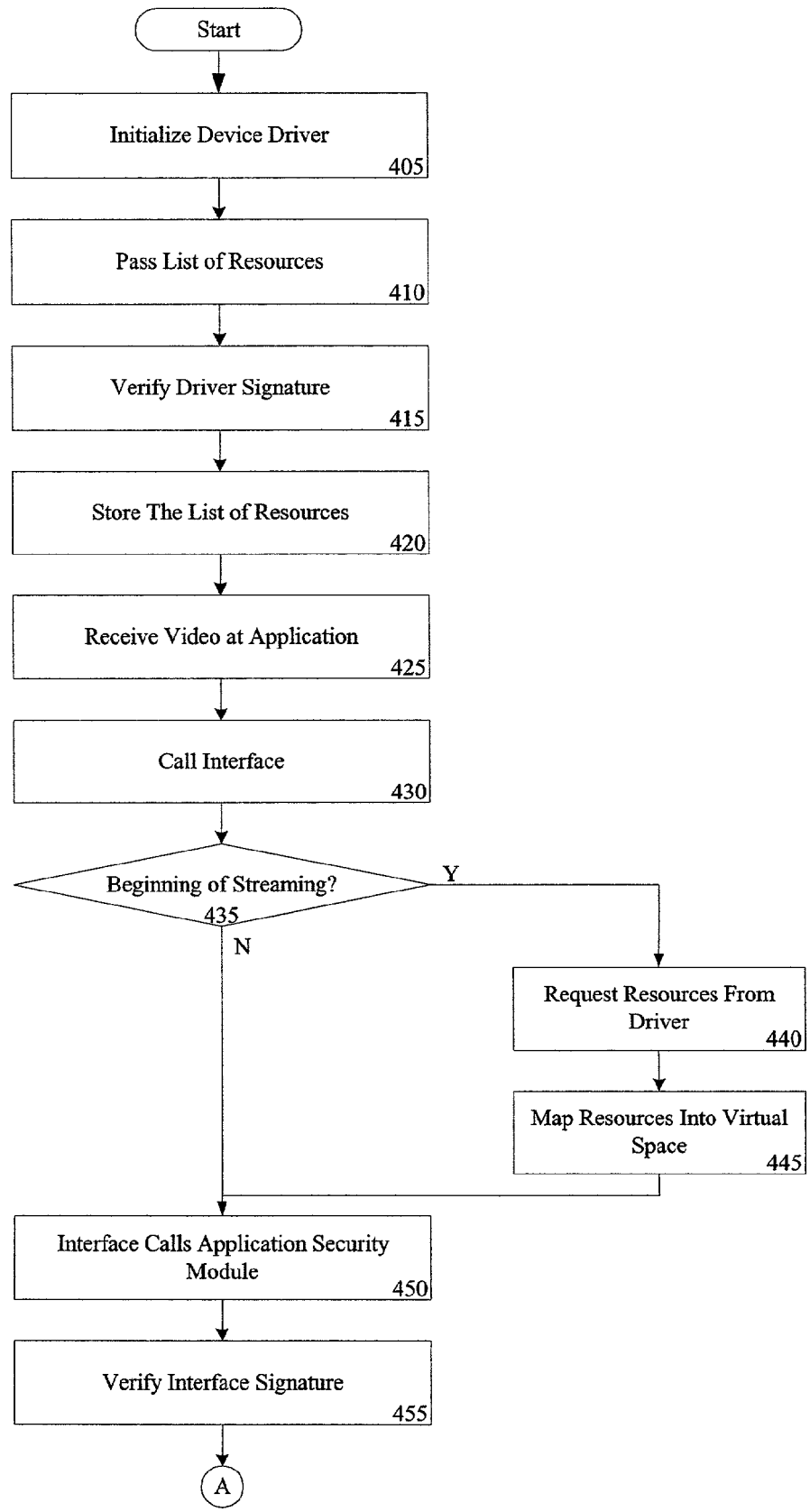
FIG. 4 is a flow diagram for one embodiment of protecting memory mapped control registers from unauthorized access.
Figure 4B:
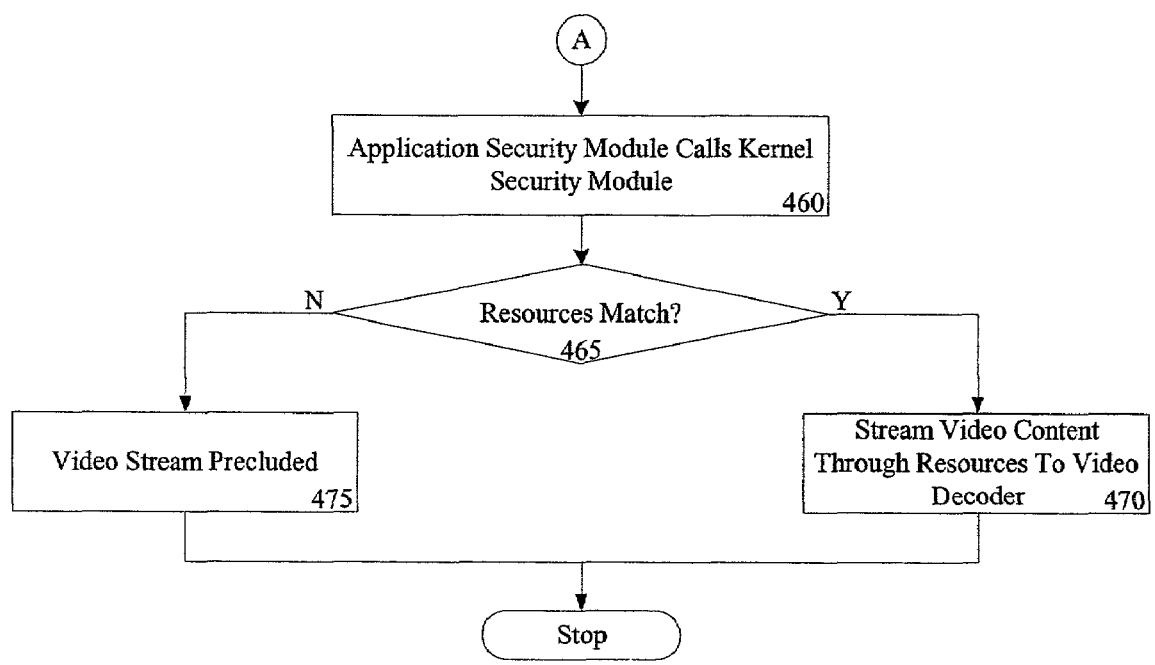

FIG. 4 is a flow diagram for one embodiment of protecting memory mapped control registers from unauthorized access. At processing block 405, device driver 330 is initialized upon computer system 200 boot up. In particular, driver 330 locates video decoder 223 and allocates any detected physical resources (e.g., physical hardware registers).

At processing block 410, driver 330 passes the list of resources to kernel security module 340. At processing block 415, security module 340 verifies the digital signature of the calling driver 330. At processing block 420, security module 340 securely stores the list for later use. As a result, security module 340 encrypts the list and prevents unauthorized access.

At processing block 425, an application program, not shown, begins to receive video content from content source 310. At processing block 430, the application calls application level interface 320 to stream content to video decoder 223. At decision block 435, it is determined the application call is the beginning of streaming (first call).

If it is determined that it is the beginning of streaming, interface 320 requests resources from device driver 330, processing block 440. At processing block 445, driver 330 maps the resources into a virtual space accessible from the application, and returns the resources. At processing block 450, application level interface 320 calls (e.g., forwards the virtual memory address) application level security module 350 to validate the resources to which the application intends to stream the content.

At processing block 455, application security module 350 verifies the signature of interface 320. At processing block 460, application security module 350 calls kernel security module 340 in order to verify the application's virtual resources map. As a result, the application's virtual resources map is compared to the stored list of physical resources.

At decision block 465, it is determined whether the resources match. If the resources match, the video content is streamed through those resources directly to video decoder 223 for processing, processing block 470. Otherwise, the video content will be precluded from steaming to video decoder 223.

If at decision block 435, it is determined that it is not the beginning of streaming, control is forwarded to processing block 450 where application level interface 320 calls application level security interface 350 to validate the resources to which it intends to stream the content.

The above-described method and mechanism enables a secure video playback application to ensure that it is streaming content through resources that were allocated by a known legitimate kernel level device driver. The device driver will allocate and secure these resources at boot time, making it difficult to modify the resource list at run time.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A method comprising:
forwarding a first list of hardware registers from a device driver to a first security module upon initializing the device driver at startup of a computer system;
verifying, at the first security module, a digital signature of the device driver;
storing the first list of hardware registers;
receiving video data at an application program;
receiving a second list of hardware registers from the device driver upon a first application call from the application program at the beginning of video data streaming;
determining whether the first list of hardware registers matches the second list of hardware registers; and
if so, streaming the video data to a video decoder.

2. The method of claim 1 further comprising precluding the streaming of the video data to the video decoder if the first list of hardware registers does not match the second list of hardware registers.

3. The method of claim 1 further comprising encrypting the first list of hardware registers prior to storing the first list of hardware registers.

4. The method of claim 1 further comprising:
the application program calling an interface upon receiving the video data;
the interface requesting the second list of hardware registers from the device driver; and
mapping the second list of hardware registers to a virtual resource map that is accessible by the application.

5. The method of claim 4 further comprising:
the interface calling a second security module to verify the second list of hardware registers; and
the second security module calling the first security module in order to verify the virtual resource map.

6. The method of claim 5 further comprising verifying, at the second security module, a digital signature of the interface prior to calling the first security module.

7. The method of claim 6 wherein the second security module calls the first security module via a secure link.

8. A computer system comprising:
a player application that receives data content;
a decoder that stores and decodes the data content received at the player, the decoder including hardware registers to store the data content;
a driver, coupled to the decoder, that allocates the hardware registers within for access by the player application; and
a first security module, coupled to the driver, that secures a first list of resources corresponding to the hardware registers forwarded from the driver upon initializing the driver at startup of a computer system to prevent unauthorized access of the data content within the hardware registers; receives a second list of hardware registers from the driver upon a first application call from the player application at the beginning of data content streaming; and verifies the integrity of the driver via digital signatures prior to receiving the first list of resources and determining whether the first list of resources corresponding to the hardware registers matches the second list of resources corresponding to the hardware registers: and if so, streaming the data content to the decoder.

9. The computer system of claim 8 further comprising an interface, coupled to the player application, the driver and the decoder, that decrypts the data content prior to the data content being stored in the hardware registers.

10. The computer system of claim 9 wherein the driver verifies the integrity of the interface via digital signatures and public/private key technologies.

11. The computer system of claim 9 further comprising a second security module coupled to the interface and the first security module.

12. The computer system of claim 11 wherein the second security module receives a second list of resources from the interface whenever the player application is to release the data content from the hardware registers.

13. The computer system of claim 12 wherein the second security module retrieves the first list of resources from the first security module and compares the first list of resources to the second list of resources.

14. The computer system of claim 13 wherein the data content is released from the hardware registers if the second list of resources matches the first list of resource.

15. The computer system of claim 11 wherein the connection between the first security module and the second security module is secured by a random number secret key system.

16. An article of manufacture including one or more computer readable storage media that embody a program of instructions, wherein the program of instructions, when executed by a processing unit, causes the processing unit to:
    forwarding a first list of hardware registers from a device driver to a first security module upon initializing the device driver at startup of a computer system;
    verify, at the first security module, a digital signature of the device driver;
    store the first list of hardware registers;
    receive video data at an application program;
    receive a second list of hardware registers from the device driver upon a first application call from the application program at the beginning of video data streaming;
    determine whether the first list of hardware registers matches the second list of hardware registers; and
    if so, stream the video data to a video decoder.

17. The article of manufacture of claim 16 when executed by a processing unit, further causes the processing unit to preclude the streaming of the video data to the video decoder if the first list of hardware registers does not match the second list of hardware registers.

18. The article of manufacture of claim 16 when executed by a processing unit, further causes the processing unit to encrypt the first list of hardware registers prior to storing the first list of hardware registers.

19. The article of manufacture of claim 16 when executed by a processing unit, further causes:
    the application program to call an interface upon receiving the video data;
    the interface to request the second list of hardware registers from the device driver; and
    mapping the second list of hardware registers to a virtual resource map that is accessible by the application.

20. The article of manufacture of claim 19 when executed by a processing unit, further causes:
    the interface to call a second security module to verify the second list of hardware registers; and
    the second security module to call the first security module in order to verify the virtual resource map.

21. The article of manufacture of claim 20 when executed by a processing unit, further causes verifying, at the second security module, a digital signature of the interface prior to calling the first security module.

* * * * *